Oct. 27, 1953    L. A. JOHNSON ET AL    2,657,080
SEAL FOR RAILROAD JOURNALS Filed Feb. 9, 1953

INVENTORS
LLOYD A. JOHNSON
EZRA D. MOSHER
BY CLIFFORD A. STEPHENS

ATTORNEY

Oct. 27, 1953    L. A. JOHNSON ET AL    2,657,080
SEAL FOR RAILROAD JOURNALS
Filed Feb. 9, 1953    6 Sheets-Sheet 2

INVENTORS
LLOYD A. JOHNSON
EZRA D. MOSHER
CLIFFORD A. STEPHENS
BY
ATTORNEY

Oct. 27, 1953  L. A. JOHNSON ET AL  2,657,080
SEAL FOR RAILROAD JOURNALS
Filed Feb. 9, 1953

INVENTORS
LLOYD A. JOHNSON
EZRA D. MOSHER
CLIFFORD A. STEPHENS
BY
ATTORNEY

Oct. 27, 1953

L. A. JOHNSON ET AL 2,657,080

SEAL FOR RAILROAD JOURNALS

Filed Feb. 9, 1953

INVENTORS
LLOYD A. JOHNSON
EZRA D. MOSHER
CLIFFORD A. STEPHENS
BY
ATTORNEY

Oct. 27, 1953

L. A. JOHNSON ET AL

2,657,080

SEAL FOR RAILROAD JOURNALS

Filed Feb. 9, 1953

INVENTORS
LLOYD A. JOHNSON
EZRA D. MOSHER
CLIFFORD A. STEPHENS
BY
ATTORNEY

Patented Oct. 27, 1953

2,657,080

UNITED STATES PATENT OFFICE 2,657,080

SEAL FOR RAILROAD JOURNALS

Lloyd A. Johnson, Woodside, and Ezra D. Mosher and Clifford A. Stephens, Palo Alto, Calif., assignors to National Motor Bearing Co., Inc., Redwood City, Calif., a corporation of California Application February 9, 1953, Serial No. 335,628

7 Claims. (Cl. 286—6)

This invention relates to sealing devices for retaining lubricant in a bearing housing from which a shaft projects and for preventing dirt from entering the housing via the shaft opening. Such a sealing device has particular application in the journal boxes of railroad cars and the like. This application is a continuation-in-part of application, Serial No. 316,242, filed October 22, 1952 by Lloyd A. Johnson, Ezra D. Mosher, and Clifford A. Stephens.

The primary object of this invention is to provide a fluid seal for the trucks used under the majority of the railroad freight cars in use today. These are supported on trucks having axles with extensions beyond the wheels journaled in the truck side frames. The support in these frames is by means of brasses (bearings) which ride on and partially cover the top half of the rotating axle journals. Each brass provides a supporting base for the journal box housing and spring connection to the car body. Because of the tremendous weight put on each of these brasses, an adequate film of lubricant must constantly be provided between the journal shaft and its brass, to prevent the bare metals from rubbing on each other so the heat of friction can destroy the bearing.

The common method of lubricating these bearings has been, and still is, to provide a journal box enclosure around the axle journal in which oily waste is packed to apply lubricant to the exposed bottom surface of the journal as it rotates. When all goes well, the oil adheres to the journal surface and is carried in under the brass to provide a thin film of lubricant between the two relatively moving bearing parts. From time to time additional oil is poured into the journal box reservoir so the waste can soak it up with a wick-like action and rub it on the journal. Under average operating conditions, brasses so lubricated will last for about 20,000 miles which, in the case of the average freight car, represents an 18 to 24 month service period. This is a relatively short life and one object of the present invention is to extend this brass life three to four times longer with a consequent tremendous saving in repair crew time for the railroad.

Another object of the present invention is to eliminate the hot box problem. A hot box results when a condition comes about that increases the friction between the brass and the axle journal so there is a rise in temperature sufficient to melt the bearing metal in the brass or to set fire to the oil and waste in the journal box.

"Hot box" trouble is a large item of maintenance expense for the railroads, not to mention the expensive delays for "set-outs." Even though no wreck occurs, it is usually necessary to take the affected car out of service to dismantle the axle and journal box for repairs. If the danger goes unobserved, a costly wreck with loss of life may result as, for example, where the axle crystallizes due to the heat and breaks off near the wheel. The present invention makes a "hot box" a rarity for reasons pointed out hereinafter.

Another object of the present invention is to provide the journal housing with an adequate fluid-tight lubricant seal between the housing and the shaft where the latter enters the back side of the housing. This seal replaces the wooden dust guard used heretofore. Such an improved seal permits the use of more costly oil of higher film strength as the lubricant film between the journal and the brass, because the seal prevents the expensive lubricant from leaking out of the housing. Such a leak proof structure, of course, eliminates the use and expense of the waste packing.

Another object of the invention is to provide a sealing member which can be placed loosely in the slot in the axle housing before the axle is inserted into the housing. Then when the load of the car body is put on the brasses, the axle can shift upwardly in relation to the journal box, changing the initial alignment of the oil seal with respect to the housing.

The axle housing is not a finely machined structure and the position the axle takes in it is dependent on the thickness of the brass and other variables.

The cast journal housing has only a roughly cast slot to receive whatever device is provided for closing the gap between the housing and the axle where the axle enters the housing. The width of this slot varies in different castings. Its inside wall surfaces are not machined, but contain the unevennesses usual in cored castings.

The present invention provides an oil seal construction that is capable of being locked in the journal housing slot in sealing relation about a railroad car axle, at the time of installation when properly centered.

Another object of the present invention is achieved by providing an oil seal that may be used in existing journal boxes without any substantial structural changes in the latter being required.

Another object of the present invention is to provide a resilient oil seal construction that will absorb severe shocks and change of position without destroying its fluid-tight sealing qualities.

Another object of the present invention is to provide an oil and dust seal structure which will not be damaged by the slot walls when there is combined axial and radial shifting of the journal relative to the journal housing, which could pinch the sealing member between an adjacent protruding slot wall and the journal. This occurs at times under the impact when cars are being coupled, or are started with a jerk.

The present invention accepts the slot in the journal housing as it is in hundreds of thousands of existing railway cars and provides an expansible anchoring member which can be secured with a leak-tight fit against the walls of the slot. It then closes the gap between the shaft and this anchoring member with a resilient member having (a) an annular shaft engaging portion to form a leak-tight sliding fit on the shaft to seal in the lubricant and to seal out the dirt; and (b) a resilient diaphragm member connecting the shaft engaging portion to the anchoring member, so that any radial or axial movement of the shaft relative to the housing will not disturb the anchoring member or the shaft seal. The expansible anchoring member, the shaft engaging portion, and the connecting diaphragm member comprise a unitary whole.

A feature of the present invention is having the unitary seal in position with its shaft engaging portion on the shaft, which serves to center it, before the anchoring member is secured against lateral or rotary movement in the journal housing slot. Thus when the sealing lip is in operative position on the shaft and the anchoring member is evenly centered around the shaft (with the load on the shaft), then is the anchoring means activated to anchor the device against the walls of the slot.

Another new concept is the provision of a rigid nonexpansible conforming and deflecting ring secured to the shaft engaging portion of the seal. This ring performs a dual function. First, it assures a leak-tight engagement of the sealing lip on the journal shaft regardless of sudden extreme radial movement of the journal housing and anchoring portion of the seal relative to the shaft which movement would otherwise tend to separate the sealing lip from the shaft. Second, by providing this ring with the angularly disposed cam face, the ring will guide the wiping lip of the sealing member out of the way if the slot wall moves closer than normal toward the shaft. What happens when there is an abnormal movement of the shaft relative to the journal box is that the slot wall will engage the cam face of the ring and deflect the ring and its associated sealing lip to a safe position to prevent its being pinched between the inwardly protruding slot walls and the shaft.

Briefly summarized, what the present invention provides is a self-contained, unitary sealing device with a sealing lip adapted to engage the journal shaft with a leak-tight fit; a flexible easily distortable diaphragm connecting this sealing lip to the anchoring member which latter member is axially expandable with means for holding it axially contracted until it is properly centered in the slot in the journal housing. When expanded in the slot it provides an anchor for the whole sealing unit and it completely seals out the dust and seals in the oil in the journal housing.

In compliance with the statute, one form of structure embodying the invention will be described in detail, but with the understanding that in doing so it is not our intention to limit the invention to the precise parts so described, because the components of the combination may be varied in form and still retain the benefits of the new combination.

In the attached drawings:

Figs. 8 and 9 are fragmentary views of the outer edge of the sealing device in the slot, showing one form of mechanism for holding the anchoring member in an axially compressed condition. Fig. 8 shows it before it is expanded in the slot, and Fig. 9 shows it with the anchor members expanded axially against the walls of the slot;

In a broad view, the device of the invention comprises the combination of the resilient shaft engaging member A, the outer expansible anchoring member B, and the resilient diaphragm member C, connecting the anchoring member to the sealing member. In its preferred embodiment, the device has built into it some form of releasable locking means D, so that prior to installation the opposite outer radial faces of the anchoring member may be held compressed axially into a smaller dimension than the space between opposite walls of the slot E in the housing F. External contracting means, like pliers, may be used to hold the anchoring parts compressed during installation, but the preferred arrangement is to have the releasable locking means D built in or arranged to engage behind the faces of the anchoring parts.

Secured in the shaft engaging member A is a seal conforming and deflecting cam ring G which serves the double purpose of holding the flexible shaft engaging member A to the shaft while also acting to deflect the member A sidewise before it can be pinched between the shaft and the slot wall if the latter approaches too close to the shaft.

Figure 1:
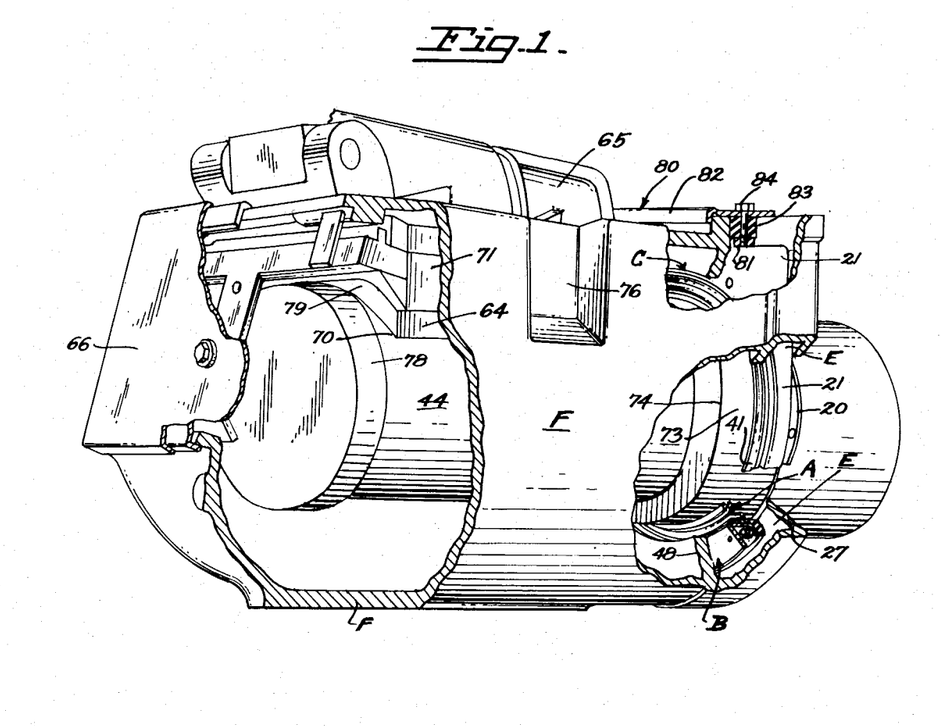
Fig. 1 is a view in perspective of one form of the self-contained unitary sealing device installed in a typical cast journal housing, showing its relation to the shaft and housing, with certain parts broken away.
Figure 2:
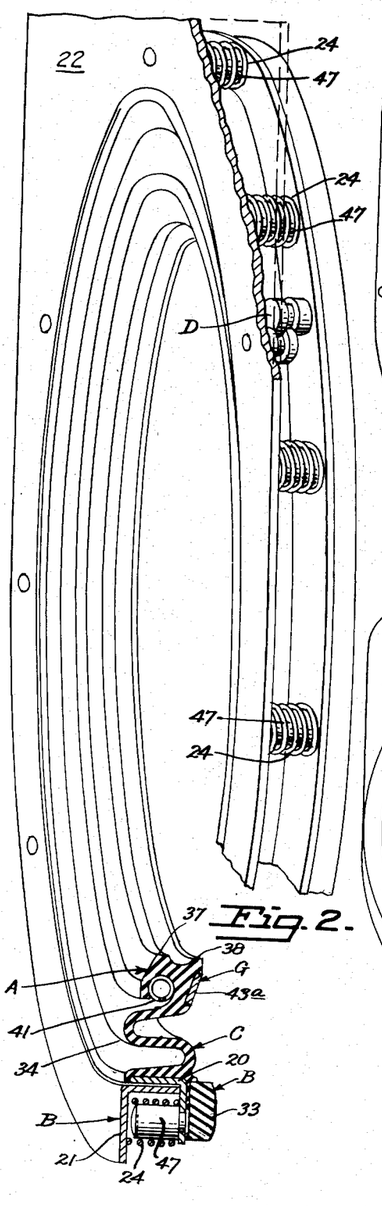
Fig. 2 is a view in perspective of the sealing device of Fig. 1, prior to installation, partly broken away to show a cross section of its component parts.

Referring now to Figs. 1 and 2, where one form of our invention is shown, there is the shaft engaging portion A, the expansible anchoring means B, the connecting diaphragm C, and the conforming and deflecting cam ring G.

The anchoring means

Figure 3:
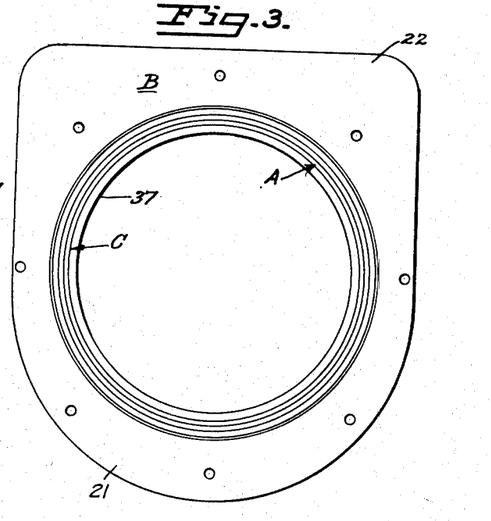
Fig. 3 is an end view in elevation looking toward the left side of Fig. 2.
Figure 4:
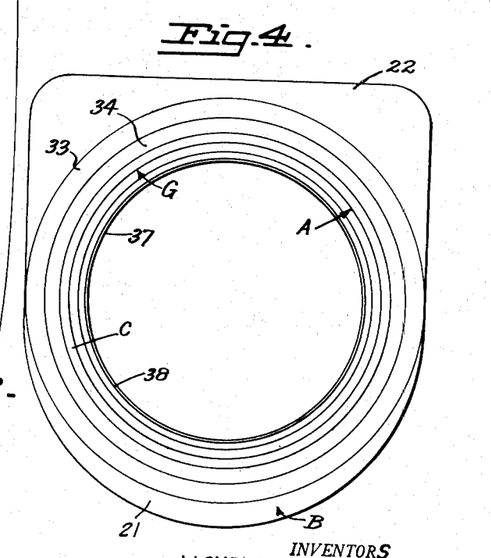
Fig. 4 is a like view looking toward the right side of Fig. 2.
Figure 7:
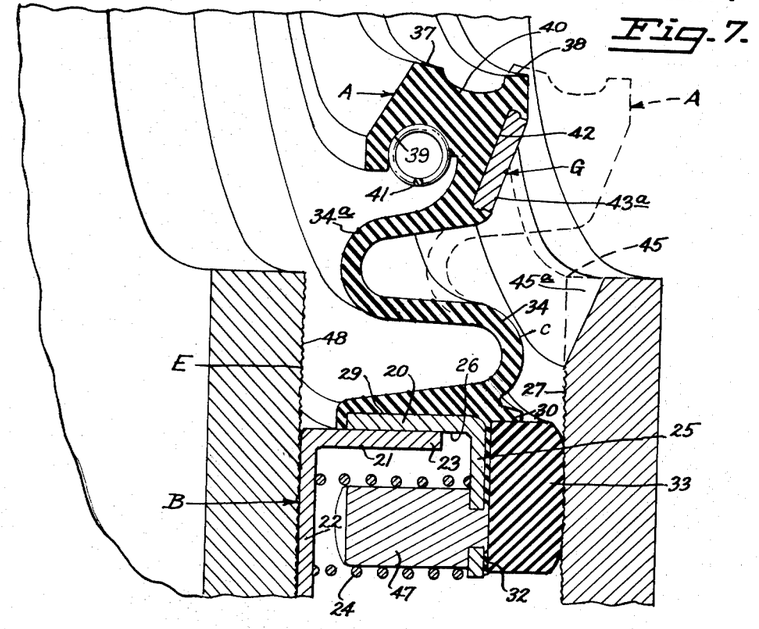
Fig. 7 is an enlarged fragmentary perspective view of the sealing device secured in the slot of the housing.

The anchoring means is shown in Fig. 7 as comprising two slidably nested annular cup-like rigid case members 20, 21. The anchor case member 21 has a radial flange 22 and an axial flange 23 and is made from a stamping, or a die casting, or other rigid material. Presence of the axial flange 23 is not essential as the principal functions of the anchor case member 21 are (a) to act as a presser foot when the anchoring means is expanded, (b) to restrain the springs 24 when the case members are held close together by the locking means, and (c) to act as part of the locking means. The radial flange 22 is especially shaped (Figs. 2 to 4), to adapt itself to the usual journal box for a reason that will later appear. In some constructions, as also noted later, the member 21 may be omitted.

The other anchoring case member 20, termed a rim supporting portion in some of the claims, has a radial flange 25 and an axial flange 26 and is made from a stamping, or a die casting, or other rigid material. Presence of the axial flange 26 is preferred here unless the thickness of the radial flange 25 is sufficient to give substantial rigidity to the flange 25 so that when it is functioning to hold the device anchored in the slot, it will distribute fairly evenly over its face the expanding pressure exerted by the springs 24. This pressure may total more or less than 100#. The important thing is to have enough pressure to hold the anchoring member in place against movement due to shocks or to torque produced by contact of the wiping lip on the shaft.

The outer periphery of the connecting flexible diaphragm C is secured to the anchor case member 20 in any way that will assure a leak-tight long-life support of the diaphragm C against the wall 27 of the slot E. As shown in the drawings, the diaphragm C and the shaft sealing or axle receiving portion A are molded from suitable flexible rubber, or rubber-like materials, well known to this art, and the mold is provided with a recess to support in it the anchor case member 20 during the molding operation so the member 20 and the rubber molded portions come out as one part. Similarly, the cam ring G is molded into the rubber during the same operation. If leather, metal, or other materials are used for the diaphragm C, the means of fastening the diaphragm to the anchor case member 20 or to the ring G are already well known in this art. Referring to Fig. 7 of the drawings, we show a preferred form of the diaphragm C as molded and having its outer periphery 29 bonded to and embracing the inner axial and outer radial faces of the rigid case member 20. The mold is made so as to form an annular rib 30, and a depressed cementing surface portion 32.

One of the reasons for the success of this device is that the anchoring case member 20 takes the wall 27 of the slot as it is with its usual rough pebbly cast surface and makes a fluid tight anchoring fit against it. This calls for the radial face of the case member 20 to be covered with a soft easily flowable material which preferably is substantially continuous with the molded sealing member AC. In this instance, no harm comes from the "cold flow" inherent in some rubbery material because the springs 24 take up for this flow and the flow assures an even tighter gasketing and anchoring effect on the slot wall 27 as the device continues in use. Thus, in the space below rib 30 we prefer to use a resilient ring-like member 33 (of a softer durometer reading than is used for the diaphragm C) which may be of any desired radial width, but which is preferably relatively wide, as shown. A substantial axial width is also preferred. Also, it is preferable to have the springs 24 arranged at evenly spaced points around the case and directly opposite the resilient member 33.

The resilient sealing member

Figure 11:
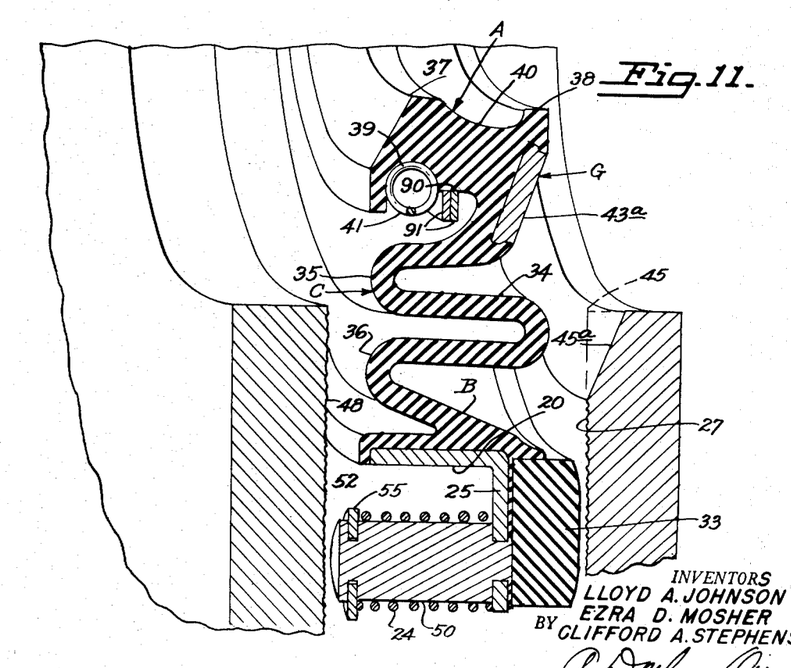
Fig. 11 is a view like Fig. 7 showing a modified form of sealing device and anchoring expansion means with the expansion means in an unexpanded position.

The diaphragm C may be as shown in cross section in Fig. 7 with a sloping membrane 34 having a single fold 34a, or it may be as shown in cross section in Fig. 11, with a plurality of folds 35, 36. The function of the membrane in either case, besides acting as a barrier to the escape of lubricant and to the entrance of dirt, is first to support the anchor member B in correct position in the slot at the instant the anchor member is expanded into anchoring position, and thereafter to support the axle shaft receiving portion A with sufficient freedom of movement so it goes with the shaft in its radial and axial movements in the housing. The axial movements of the shaft in the housing may extend within a range of 1¼" and the radial movement may extend to ⅜". Because of its functions as supporting the anchoring member B in correct anchoring position in the slot, we prefer to have the diaphragm C rigid enough to hold the weight of the anchoring case members 20, 21 without much, if any, deflection. If a less rigid diaphragm is desired, a line to support the weight of the case until the anchoring means is in effect may be brought up through the top of the slot E for proper support during installation.

It will be noted that the transverse dimensions of the entire sealing member unit are such that should an unusually severe shock occur, the portions A, B, or C, of the sealing member, would not be pinched between the casing walls, surrounding slot E, and the shaft 44, but would telescope into the slot E due to the resiliency of the diaphragm portion C. To insure that the sealing member will not be so damaged, a seal deflecting cam ring G is provided, as will presently be more fully described.

The shaft engaging portion A of the device preferably is molded of the same material as the diaphragm C, and has the shaft engaging lip 37 which seals against leakage of oil along the shaft and the shaft engaging flange 38 which acts as a dust and dirt seal. A groove 39 is molded in the flange 40 preferably directly below the lip 37 to receive the pressure applying garter spring 41.

The seal conforming and deflecting cam ring

Figure 10:
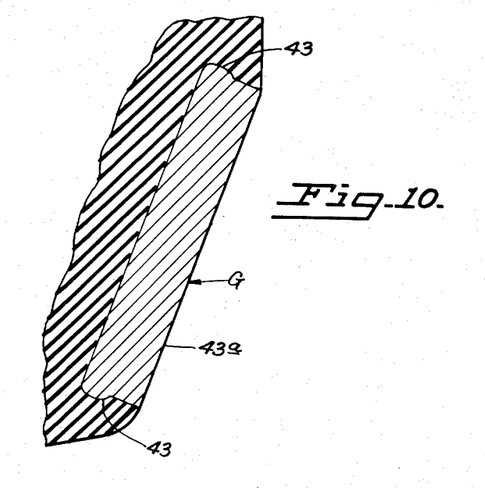
Fig. 10 is an enlarged fragmentary cross section of one form of a conforming and deflecting cam ring showing the manner in which it is secured in the sealing lip.

The shaft engaging portion A has an angularly disposed face 42 into which is bonded a seal conforming and deflecting cam ring G. Ring G, as shown in enlarged section in Fig. 10, may have inner extending anchor portions 43 to strengthen the bond. The function of the ring G is both to conform the shaft sealing portion A to the shape of the shaft 44 and to insure that the sealing member will not be pinched between the casing walls, surrounding slot E, and the shaft 44. The ring G may be made of metal, plastic, or any other rigid durable material.

As a conforming ring, the ring G performs the novel function of holding the shaft sealing lip 37 in sealing contact with the shaft 44 no matter how sudden an impact is applied to the shaft. This jarring of the axle may come each time the car wheel passes over a switch or a track joint. Suppose the impact is upward, the sudden lifting of the axle 44 will tend to lift its lower side away from the portion of the lip 37 at X in Fig. 5, and leave a momentary gap through which oil might escape along the shaft. This is what occurs under certain conditions when the ring means G is not used. We find that when such a rigid control ring is used, under the above conditions, it will follow the shaft movement and will support the lower portion of the flexible sealing member so that the spring 41 will have no difficulty in retaining the lip 37, at X, in contact with the shaft. The support ring G is in concentric relation to the shaft at all times and maintains the sealing lip in the same relative condition. Of course, additional rigid rings may be utilized in performing this shape conforming function, as will appear in the discussion of Fig. 11.

Figure 5:
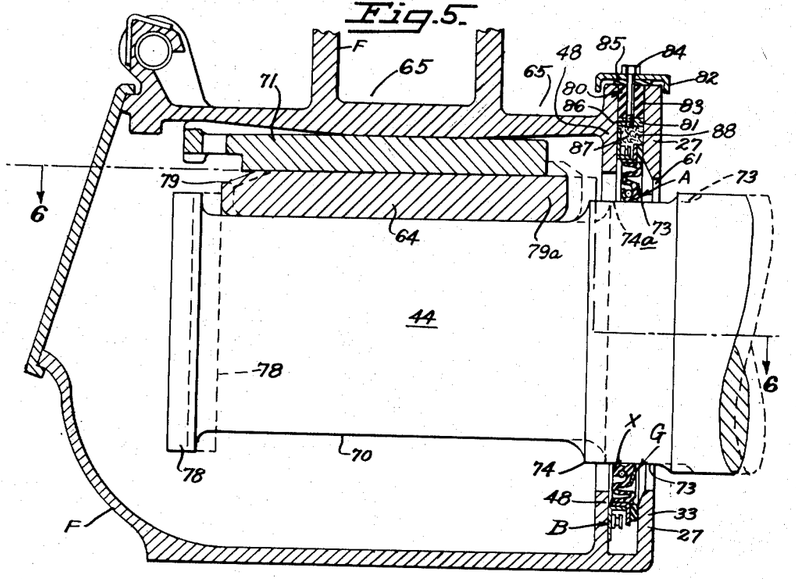
Fig. 5 is a view in elevation of one bearing end of an axle shaft showing the associated journal housing in cross section and the sealing device in operative position on the shaft.
Figure 6:
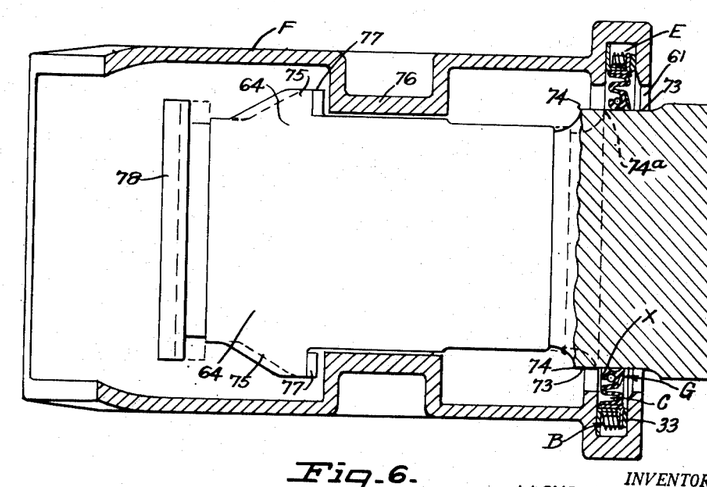
Fig. 6 is a view in horizontal section along the line 6—6 of Fig. 5.

In its function as a deflecting cam, the ring G comes into operation to protect the sealing member A whenever the journal housing F executes a sudden gyratory-like motion with respect to the shaft 44, which brings the edge of the slot wall 27 toward or into actual contact with the axle shaft and thereby pinches or crushes anything lying between these two surfaces. Such a pinching or crushing movement would usually occur under conditions of severe impact such as when coupling or braking railroad cars, but it might also occur in connection with defective roadbeds or derailments. As is illustrated in Fig. 7, such a severe motion would not pinch or crush the sealing portion A if the parts were in this relative radial alignment, but should this motion come at a time when the axle shaft had pulled the sealing portion A to the right (see dotted lines Fig. 7), then the slot wall would come into contact with the sloping wall G on portion A. To allow for as much sidewise movement as possible for the portion A and to achieve as gentle a camming operation as possible, the corner 45 of the housing wall 27 may be ground off to provide a corresponding angular or rounded cam face 45a (Figs. 5 to 7). Preferably the cam faces 43a and 45a are parallel to one another. The angle of the cam faces may be any angle designed to promote proper operation of the cam surfaces. However, an angle of 20 degrees to the vertical has been found most efficient for this purpose.

The hard tough deflecting cam ring G with its angular cam face 43a coacts with the housing wall 27 to deflect the shaft sealing portion A sidewise on the shaft 44 into a safe position intermediate the walls of the slot E. It will be observed that the shape and position of the seal conforming and deflecting cam ring G, relative to the shaft seal member A and to the slot cam 45a when it is in the dotted line position, provides a novel simultaneous functioning of both, thereby protecting the shaft sealing member and insuring long service of the shaft seal.

Having described a preferred and successful form of shaft sealing member in compliance with the statute, we wish to make it clear that the shaft sealing member may be varied in shape from the one shown and still come within the scope of the claims as interpreted in the light of the art.

The releasable locking mechanism

A preferred form of manually releasable means for locking together the two anchor case members 20, 21 before insertion into the parallel walled slot E is shown in Figs. 2 and 4 to 9. Several alternatives are illustrated in Figs. 11 to 15.

Figure 8:
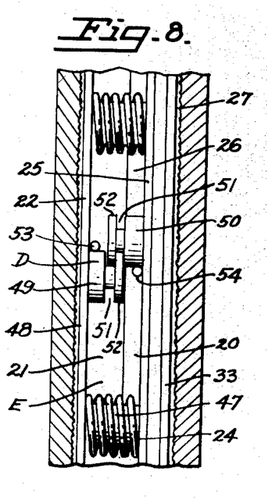
Figure 9:
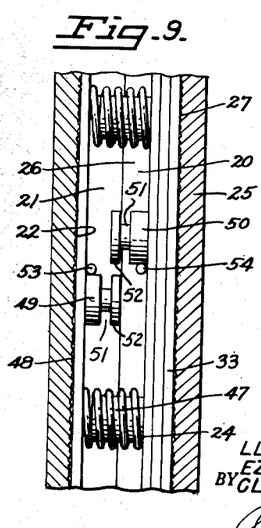

In Figs. 2 and 8, the case members 20, 21 are locked together, while, in Figs. 5 to 7 and 9, they are unlocked and firmly anchored in the slot E by expansion of the compression springs 24.

Referring to Fig. 8, the radial wall 25 of the anchor case member 20 has studs 47 riveted to it at evenly spaced points, each adapted to position a coil compression spring 24 so it acts in an axial direction. These springs 24 are long enough so they have not reached the limit of their expansion when released and when the anchor case members 20, 21 are fully pressed against the walls 27 and 48 of the slot E.

As mentioned earlier, we prefer some means between the two anchor case members 20, 21 for securing them in a releasable, locked position with the outer axial limits of the members held in a reduced dimension smaller or substantially no greater than the space between the slot walls 27, 48. In this way, the seals can be supplied by the factory ready for insertion by the customer into the slot E and capable of being locked in the slot merely by releasing the locking means.

In Fig. 8, the locking means shown comprises a plurality of studs 49 secured to the anchor case member 21, and a like number of studs 50, secured at like spaced points on the anchor case member 20. Each stud has a recess 51 cut back from its end, which is wide enough and deep enough to receive the head 52 formed at the stud end by cutting the recess. In the factory, when assembling the seal for shipment to the customer, the workman places a spring 24 on each stud 47, then he slides the anchor case member 21 inside the case member 20. Next he rotates the case member 21 to bring each stud 49 alongside its mated stud 50, then he presses the anchor case members together to bring each head 52 into alignment with each recess 51. When this alignment is accomplished, he rotates one case member relative to the other to bring each head 52 into the recess 51 lying adjacent it, and releases the pressure leaving the sealing member as an assembled unit, as shown in Figs. 2 and 8. In the factory, this assembly is accomplished in a jig because the combined spring pressure to be overcome may be in the range of 100 pounds and to rotate the case 21 to lock it requires it to slide on the ends of the springs 24.

To unlock the anchor case members 20, 21 when installing the sealing unit in a slot E, a pronged tool is supplied the customer by which the workman can place one prong 53 against the stud 49 (see Fig. 8), and the other prong 54 against the stud 50, to move the studs apart radially. This moves the heads 52 out of the recesses 51 in all the studs 49, 50, simultaneously and leaves the parts in the position of Fig. 9.

It is preferred that the radial face 22 of the anchor case member 21 be enlarged (see Figs. 2 to 4) in its upper half so as to be generally square shaped while its lower end can be circular in shape. This particular shape adapts the case member to making a better fit against the inner housing wall 48 of the slot E, and prevents the oil bath from splashing into the slot and out of housing F through the open top of the slot.

Closure member for the housing slot

To further limit the splashing of oil out of the slot E, as well as to prevent the entry of dust and grit into the slot, a slot cover member 80 is provided. See Fig. 5. The cover member includes a bottom clamp plate 81, an upper clamp and cover plate 82, a resilient expansion member 83, and tightening bolts 84. Spacer members 85 are provided to ride on the casing under the upper clamp plate 82 to space it away from the casing throughout its periphery.

The expansion member 83 is of less longitudinal length than the slot E so that a space exists in the slot E at either end of the cover to allow escape of vaporized lubricant fumes. The upper clamp plate 82 serves to deflect these gases and may have down-turned flanges to prevent entry of dust.

The cover is installed by inserting it in the slot E and then tightening the bolts 84 into the threaded holes 86 in the lower clamp plate, which expands the resilient member 83 against the sides 48 and 27 of the slot.

The cover 80 effectively prevents dust and grit from entering the slot in any but minute quantities. Should any dust enter, it may be prevented from reaching the seal by providing filtering material 87 such as steel wool in the space 88.

The axle stop mechanism

This arrangement is preferably employed to cut down on the amount of axial movement of the shaft in the journal box so as to make certain that the shaft sealing member A is not pulled over the shoulder 74 of the dust guard seat portion 73 of the axle shaft onto the smaller diameter main bearing portion 70.

Referring to Figs. 5 and 6, it will be seen that the journal end of the axle has the main bearing portion 70 with the enlarged shoulder 78 at its outer end and the enlarged dust guard seat 73 at its inner end. The brass (bearing shoe) 64 is shorter than the main bearing portion 70 on which it bears and has curved ends 79 and 79a which engage respectively against shoulders 78 and 74. In operation, the car axle slides back and forth axially under the brass 64, limited only by the contact of its ends against the shoulders 73 and 74. The brass 64 has wings 75 on each side which engage with ribs 76 in the sides of the journal box (Fig. 6). Each brass has a wedge 71 between it and the top 65 of the journal housing, and the brass can slide axially under this wedge, limited only by contact of the wings 75 against the ribs 76.

To assure that the axle shaft does not move axially far enough to permit the shaft sealing lip A of the seal to drop off the dust seal seat 73, we provide a shim 77 for each wing 75. The thickness of this shim is such that when the shoulder 78 is flush against the brass, and the wing 75 and its shim 77 is flush against the rib 76 the sealing member A will be at or near the edge of its sealing seat 73, or adjacent the dotted line position 74a in Figs. 5 and 6.

Modifications

Figs. 11 to 15 illustrate modifications of the sealing device and locking means of the present invention. Fig. 11 shows a sealing device similar to that shown in Fig. 7. However, Fig. 11, utilizes only one case member 20 and its membrane 34 is constructed with plural folds 35 and 36 to give greater freedom of movement to the shaft sealing member A.

Adjacent the groove 39 is provided a convenient cylindrical surface 90 on the flange 40 adapted to receive one or more continuous annular rigid rings 91 which will have a snug fit on the surface 90 when the sealing member is in operative engagement with the shaft 44. Whether or not one or more support rings 91 are used in conjunction with the ring G will depend upon the circumstances. As a guide on this matter, it can be said generally, that the softer the material of the sealing flange or the greater the bulk of the material in the shaft sealing member A, the more the support that will be needed from the rings like G and 91. It is better to err on the side of providing more rather than fewer such support rings because their presence does no harm. The manufacturer will want to use as few as possible in order to keep the cost down.

Figure 12:
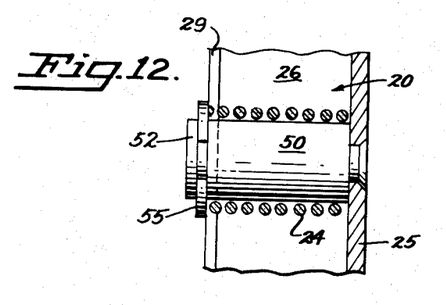
Fig. 12 is a view in elevation and partly in cross section showing an alternative form of mechanism for holding the anchoring expansion means in an axially compressed position, as might be used with the device of Fig. 11.
Figure 13:
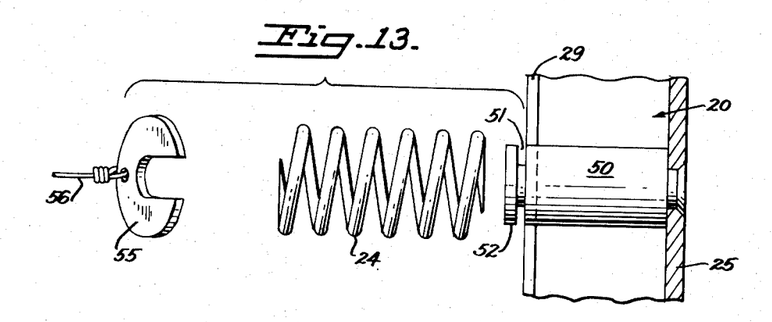
Fig. 13 is an exploded view of the parts used in Fig. 12.

The locking mechanism shown in Figs. 11 to 13 employs only one set of studs 50 on the anchor case member 20 and may omit entirely the other anchor case member 21 because the compression springs 24 will bear directly against the slot wall 48 (see Fig. 11). The spring support studs 50 are made long enough to take the spring in compressed condition. Each spring is compressed and an open slotted washer 55 with a pull wire 56 is put in place to hold it. When the customer installs the seal in a slot E and has it properly centered in relation to the shaft, each of the washers 55 is removed by a pull on its wire 56.

Figure 14:
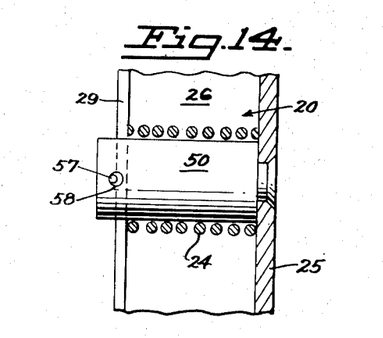
Figs. 14 and 15 show further alternative mechanism for holding the anchoring member in an axially compressed condition.
Figure 15:
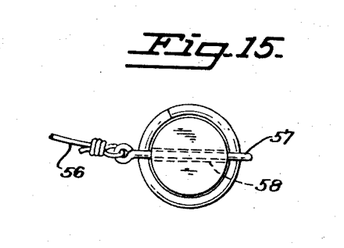

The locking mechanism in Figs. 14 and 15 is identical to the one in Figs. 12 and 13 except that a pin 57, with a pull wire 56, is inserted in a hole 58. Its operation is as described above.

Installation of the sealing device

This description will deal with the invention when it is used in a railroad car truck where each axle has its two wheels non-rotatably secured to it and the journal or bearing is on the end outside of each wheel. The car truck frame is severable on a fore and aft line so each side with its housings F can be moved in over the ends 44 of the axles. The usual procedure is for the two axles with their wheels to be supported on rails and spaced apart fore and aft so that each axle end 44 is in alignment with the opening 61 (Fig. 6) in the back side of its housing F. Next, a workman will hold one of the unitary sealing devices in the slot E in each housing in substantial alignment with the end flange 78 on each axle. Then each housing will be moved toward its adjacent wheel and as this occurs, first the flange 78 will be pushed through the shaft sealing member A, and then the shaft sealing member will be moved onto the cylindrical sealing surface 73 of each axle. When this has been accomplished, the next step is for the bearing brass 64 and the wedge 71 above it to be put in place. The housing F is held high enough so these parts can be slipped into place. Next, the housing F is lowered bringing the brass 64 to rest on top of the axle journal surface 70. The brass 64 is directly under the truck side frame and through it the load is transmitted to the axle.

The assembly operation is now at the point where the workman can give attention to anchoring the sealing member in the slot E. The first step now is to make certain that the shaft sealing member A is in operative position on shaft portion 73. Then he will inspect the anchor case members 20, 21 to make certain that they will cover the opening 61. Next, he will ascertain by means of a torch, or other suitable light projected through the service opening 66, if the diaphragm C is in neutral position; that is, is it properly supporting the anchor case member B substantially concentrically in relation to the shaft engaging portion A. If it is, he knows he can release the locking mechanism on the anchor case member. If it is not, he will take a wire with a hook on the end, insert it down the slot E, engage a spring 24 and lift or shift the anchor member B to bring it into a concentric position in relation to the shaft. While the anchor member is in such a concentric position, he will take the tool with the prongs 53, 54 and release the interlocked lugs 49, 50 allowing the springs 24 to expand the anchor case members 20, 21 axially into a non-rotative fit with the walls 27, 48 of the slot E. The fit will also be fluid tight because the sealing face 33 will be compressed by the spring pressure to make it fill all the unevennesses in the slot wall 27. This is not a milled face and is of a pebbly nature common to cored castings.

If the locking means of Figs. 11 to 15 are used, then instead of the pronged tool he will pull the wires 56 to release the springs 24 to force the anchor member B into a non-rotative, leak-tight fit against the wall 27.

While the leak-tight fit has been described as being against the wall 27, it could be against the wall 48, or against both walls.

Mention should be made of an additional function performed by the ring G and the control rings 91 when used singly or together. This comes when there is a substantial movement of the axle shaft radially in relation to its normal running position in the housing F. The diaphragm C connecting the sealing member A to the anchor member B is designed to take up for this momentary radially offset condition. However, the diaphragm C does assert a pull on the shaft engaging portion A, but by having the ring G or the control means 91, the shaft portion A cannot be tipped up enough at one edge by the pull of the diaphragm C to cause the spring 41 to jump out of its groove 39.

Another advantage of having the ring G adjacent the dust lip 38 comes to light when installing the shaft sealing member A on the shoulder 73. The installer has no way of observing what is occurring on the dust seal side as the member A goes into position on the shoulder 73. Having the ring G adjacent the dust lip 38, it is impossible for the sealing edge 38 to be turned under on the shaft shoulder 73, so a correct installation is assured.

The oiler which is used to carry oil to the shaft 44 when the oil level drops below the bottom of the shaft, is not shown as it is the subject of a different patent application.

What we claim is:

1. A unitary, self-contained, axle seal for a journal box adapted to be frictionally self-supported in the space between two parallel walls of a slot through which the axle extends in a plane normal to said slot, said axle sealing device including a flexible diaphragm having an axle receiving opening in the central portion thereof and a rim supporting portion including expansion means carried by said rim portion, manually releasable means for restraining said expansion means for free sliding movement of said rim within said parallel walled slot, whereby upon positioning of said diaphragm within said walled slot while supported on said axle said rim portion may be expanded into anchoring engagement with the walls of said slot upon release of said manually releasable means.

2. A unitary, self-contained, axle seal for a journal box adapted to be frictionally self-supported in the space between the parallel walls of a slot through which the axle shaft extends in a plane normal to said slot, said axle seal including an annular flexible axle sealing member; an anchoring case member secured to said sealing member and adapted to be supported against one of said slot walls; resilient expansible means adapted in use to exert an axial force between the other of said slot walls and said anchoring case member; and releasable locking means associated with said expansible means for holding the latter in axially contracted position sufficient so that the axial dimension of said anchoring case member and said resilient expansible means is substantially no greater than the axial dimension between the walls of said slot; said expansible means being adapted to frictionally support said sealing device between said slot walls.

3. The device of claim 2 in which said anchoring case member is composed of two case members which are releasably interlocked to enclose said resilient expansible means.

4. The device of claim 2 in which said releasable locking means is released by opposite rotary movement of said case members.

5. An axle sealing device adapted for installation in a journal assembly including a housing having a shaft opening at one end which is bordered by an adjacent inwardly opening radial slot formed by a pair of parallel walls, and has a rotatable axle extending into the housing on an axis perpendicular to the plane of said slot, said seal including an axial expansible anchoring portion for engaging the walls of said slot, a resilient axle sealing portion riding on the axle, a flexible diaphragm joining the axle sealing and anchoring portion, and a rigid conforming and deflecting ring secured in the resilient axle sealing portion having a cam face adapted to co-act with the edge of one of said slot walls to deflect the axle sealing portion to a safe position on relative movement of said shaft and walls tending to pinch the seal therebetween.

6. An axle sealing device adapted for installation in a journal assembly including a housing having a shaft opening at one end which is bordered by an adjacent inwardly opening radial slot formed by a pair of parallel walls, and has a rotatable axle extending into the housing on an axis perpendicular to the plane of said slot, said seal including an axial expansible anchoring portion for engaging the walls of said slot, a resilient axle sealing portion riding on the axle, a flexible diaphragm joining the axle sealing and anchoring portion, and a rigid conforming and deflecting ring secured in the resilient axle sealing portion providing an armored face adapted to co-act with the edge of one of said slot walls to deflect the axle sealing portion to a safe position on relative movement of said shaft and walls tending to pinch the seal therebetween.

7. In a railway journal box of the class wherein the rear wall thereof is provided with an elongated opening for the free reception of an axle thereinto, and wherein a second wall member cooperates with said rear wall to provide a dust and oil seal receiving slot around the margin of said axle receiving opening, the combination with said slot of an axle sealing diaphragm having a centrally disposed aperture for receiving and embracing the axle, an annular elastic deformable web portion surrounding said aperture and extending across the axle opening in the box wall and a diaphragm anchoring member for fixedly engaging with the walls of said slot, said anchoring member having axially spaced radial wall portions which prior to assembly are spaced apart no greater than the distance between said slot walls, and means associated therewith for expanding said wall portions apart axially to provide a frictional engagement between the walls of said slot and said wall portions, whereby relative angular movements may be maintained between said axle and journal box without exerting displacing forces upon the anchoring rim of said diaphragm within said walled slot.

LLOYD A. JOHNSON.
EZRA D. MOSHER.
CLIFFORD A. STEPHENS.

References Cited in the file of this patent

UNITED STATES PATENTS

| Number | Name | Date |
|---|---|---|
| 1,942,567 | Nelson | Jan. 9, 1934 |
| 2,177,606 | Bigelow | Oct. 24, 1939 |
| 2,181,203 | Reynolds | Nov. 28, 1939 |
| 2,438,794 | Waring | Mar. 30, 1948 |

FOREIGN PATENTS

| Number | Country | Date |
|---|---|---|
| 239,834 | Great Britain | 1925 |